(12) United States Patent
Mentgen et al.

(10) Patent No.: US 6,234,140 B1
(45) Date of Patent: May 22, 2001

(54) METHOD FOR OPERATING AN INTERNAL COMBUSTION ENGINE, ESPECIALLY OF A MOTOR VEHICLE

(75) Inventors: Dirk Mentgen, Schwieberdingen; Georg Mallebrein, Korntal-Münchingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,925
(22) PCT Filed: Nov. 18, 1998
(86) PCT No.: PCT/DE98/03402
 § 371 Date: Jul. 21, 1999
 § 102(e) Date: Jul. 21, 1999
(87) PCT Pub. No.: WO99/27245
 PCT Pub. Date: Jun. 3, 1999

(30) Foreign Application Priority Data

Nov. 22, 1997 (DE) .............................................. 197 51 887

(51) Int. Cl.⁷ .............................. F02D 41/34; F02D 41/40
(52) U.S. Cl. .................... 123/295; 123/305; 123/339.14; 123/491
(58) Field of Search ..................................... 123/295, 305, 123/339.12, 339.14, 339.19, 478, 486, 491

(56) References Cited

U.S. PATENT DOCUMENTS

| | | | |
|---|---|---|---|
| 4,344,397 | * 8/1982 | Geiger et al. | 123/339.11 |
| 5,279,272 | 1/1994 | Kruger | 123/486 |
| 5,483,934 | 1/1996 | Stutzenberger | 123/305 |
| 5,755,198 | 5/1998 | Grob et al. | 123/295 |

FOREIGN PATENT DOCUMENTS 59-155540   9/1984   (JP) .
WO9117350  11/1991   (WO) .

* cited by examiner

*Primary Examiner*—Tony M. Argenbright
(74) *Attorney, Agent, or Firm*—Walter Ottesen

(57) ABSTRACT

A method for operating an internal combustion engine especially of a motor vehicle is described wherein fuel is injected directly into the combustion chamber either in a first operating mode during a compression phase or in a second operating mode during an induction phase. The fuel mass ($m_K$), which is to be injected into the combustion chamber, is determined in both modes of operation, inter alia, in dependence upon a computed desired torque ($M_{des}$) which is to be outputted by the engine. An injection duration ($t_i$ in ms) is determined from the fuel mass ($m_K$) which is to be injected. Then, an injection angle ($\alpha_i$ in degrees) is determined from the injection duration ($t_i$ in ms) in dependence upon the rpm ($n_{motor}$) of the engine (1) Finally, the fuel is injected into the combustion chamber during the injection angle ($\alpha_i$ in degrees).

14 Claims, 2 Drawing Sheets

METHOD FOR OPERATING AN INTERNAL COMBUSTION ENGINE, ESPECIALLY OF A MOTOR VEHICLE

FIELD OF THE INVENTION

The invention relates to a method for operating an internal combustion engine especially of a motor vehicle wherein fuel is injected directly into a combustion chamber either in a first operating mode during a compression phase or in a second operating mode during an induction phase. In the method, the fuel mass, which is to be injected into the combustion chamber, is determined in both operating modes, inter alia, in dependence upon a computed desired torque which is to be outputted by the engine. The invention further relates to an internal combustion engine especially of a motor vehicle having an injection valve with which fuel can be injected directly into a combustion chamber either in a first operating mode during a compression phase or in a second operating mode during an induction phase. The engine has a control apparatus for determining the fuel mass, which is to be injected into the combustion chamber, in both operating modes, inter alia, in dependence upon a computed desired torque which is to be outputted by the engine.

BACKGROUND OF THE INVENTION

System of this kind for direct injection of fuel into the combustion chamber of an internal combustion engine are generally known. A first operational mode (a so-called stratified layer operation) and a second operating mode (a so-called homogenous operation) are distinguished from each other. The stratified layer operation is especially used at low loads; whereas, the homogeneous operation is applied for larger loads applied to the engine. In the stratified layer operation, the fuel is injected during the compression phase of the engine into the combustion chamber and to the direct vicinity of a spark plug. This has the consequence that no uniform distribution of the fuel in the combustion chamber can take place. The advantage of the stratified layer operation is that the applied lower loads of the engine can be carried out with a very low mass of fuel. Larger loads can, however, not be satisfied by the stratified layer operation. In the homogeneous operation, which is provided for such larger loads, the fuel is injected during the induction phase of the engine so that a turbulence and therefore a distribution of the fuel in the combustion chamber can easily take place. Insofar, the homogeneous operation approximates the operational mode of the engine wherein fuel is injected into the intake manifold in a conventional manner.

In both modes of operation (that is, in the stratified layer operation and in the homogeneous operation), the fuel mass to be injected is controlled (open loop and/or closed loop) by a control apparatus in dependence upon a plurality of parameters to an optimal value with a view of saving fuel, reducing exhaust gas and the like. This control (open loop and/or closed loop) is then, inter alia, dependent upon a desired value which is computed by the control apparatus. The desired torque defines the torque, which in total is to be outputted by the engine, that is, that torque which the engine should generate.

Especially during idle of the engine, it is desired that the rpm of the engine is as constant as possible. For this purpose, a method is known from U.S. Pat. No. 4,344,397 with which the idle of the engine can be stabilized. In this method, the rpm of the engine is influenced via a shifting of the ignition time point and therefore is held approximately constant. The known method is, however, only usable in an internal combustion engine wherein fuel is injected into the intake manifold in the conventional manner.

For an internal combustion engine of the type initially mentioned herein (especially in the first operating mode, that is, in stratified layer operation), the actual torque, which is generated by the engine, and therefore the rpm of the engine, is essentially only dependent upon the injected fuel mass. A change of the ignition time point is not possible in the same manner as for homogeneous operation because the igniting condition would change thereby. For this reason, the known method cannot be purposefully used for the internal combustion engine of the type initially mentioned herein.

SUMMARY OF THE INVENTION

The object of the invention is to provide a method for operating an internal combustion engine with which an rpm as constant as possible can be achieved especially during idle of the engine.

This object is solved in accordance with the invention for a method or for an internal combustion engine of the type initially mentioned herein in that an injection duration is determined from the fuel mass, which is to be injected, and that an injection angle is determined from the injection duration in dependence upon the rpm of the engine and that the fuel is injected during the injection angle.

The engine has a specific rpm at the time point of the conversion of the injection duration into the injection angle. If, for example, the rpm thereafter becomes less, then this has no effect on the computed injection angle. The computed injection angle therefore remains constant. Because of the lower rpm, this injection angle is now run through slower than for that rpm at which the computation took place. This means that the injection duration is increased. Accordingly, more fuel is injected than had been intended. This injection of more fuel has the consequence that the engine is again accelerated and therefore the rpm is increased.

With the invention, it is achieved that the rpm of the engine is held substantially constant. It is not required that the control apparatus must intervene correctively in the injection of fuel; instead, the rpm stabilization according to the invention takes place automatically without any activity of the control apparatus. The invention therefore makes a method available which can control (open loop and/or closed loop) the rpm of the engine rapidly and precisely to an approximately constant value especially during idle of the engine. Furthermore, the invention can also be applied when, for example, an essentially constant rpm of the engine is wanted for a desired torque applied over a longer time.

In an advantageous further embodiment of the invention, either an injection start is pregiven as an angle magnitude and an injection end is determined in dependence upon the injection angle or, the injection end is pregiven as an angle magnitude and the injection start is determined in dependence upon the injection angle. In this way, the particular other value can be computed in a simple manner from the injection angle in dependence upon the value which is pregiven in the particular internal combustion engine.

In an advantageous embodiment of the invention, the injection duration is converted only partially into the injection angle. In this way, it is achieved that, for example, for a reduction of the rpm after the conversion of the part of the injection duration into the injection angle, the resulting injection of additional fuel is not so greatly increased as for a complete conversion. From this, a reduced acceleration, and therefore a reduced increase of the rpm of the engine, results than for a conversion of the total injection duration into the injection angle. In this way, a correction of the rpm which is too great and a possible overshoot to an rpm of the engine which is too great is avoided.

In an advantageous embodiment of the invention, an injection start as a time duration is determined from the injection start as an angle magnitude in dependence upon the rpm of the engine and the injection of fuel is started after this time duration has elapsed. In this way, it is achieved that, for example, for a reduction of rpm after the conversion of the injection duration into the injection angle, the resulting injection of more fuel is further increased. From this, a further acceleration and therefore an increase of the rpm of the engine results. In this way, it is possible to achieve a large correction of the rpm of the engine.

In an advantageous further embodiment of the invention, the injection start as an angle magnitude is only partially converted into the injection start as a time duration. In this way, the acceleration of the rpm of the engine can be adapted to the particular conditions.

It is especially advantageous when the invention is used in the first operating mode of the engine and/or during the start of the engine and/or for open-loop control and/or for closed-loop control of the idle rpm of the engine. The desired constant rpm of the engine for simultaneous fuel saving and reduced toxic emission can be achieved with the invention especially when the engine is operated in idle in the first operating mode, that is, in the stratified mode of operation.

The realization of the method of the invention is especially significant in the form of an electric storage medium which is provided for a control apparatus of an engine and especially of a motor vehicle. A program is stored on the electric storage medium which can be run on a computing apparatus and especially on a microprocessor and is suitable for carrying out the method according to the invention. In this case, the invention is therefore realized by a program which is stored on the electrical storage medium so that this storage medium, which is provided with the program, defines the invention in the same manner as the method for whose execution the program is suitable.

Further features, application possibilities and advantages of the invention will become evident from the following description of the embodiments of the invention which are shown in the figures of the drawing. Here, all described or illustrated features define the subject matter of the invention individually or in any desired combination independently of their combination in the patent claims or their dependency as well as independently of their formulation and/or presentation in the description or in the drawing.

DESCRIPTION OF THE PREFERRED
EMBODIMENTS OF THE INVENTION

Figure 1:
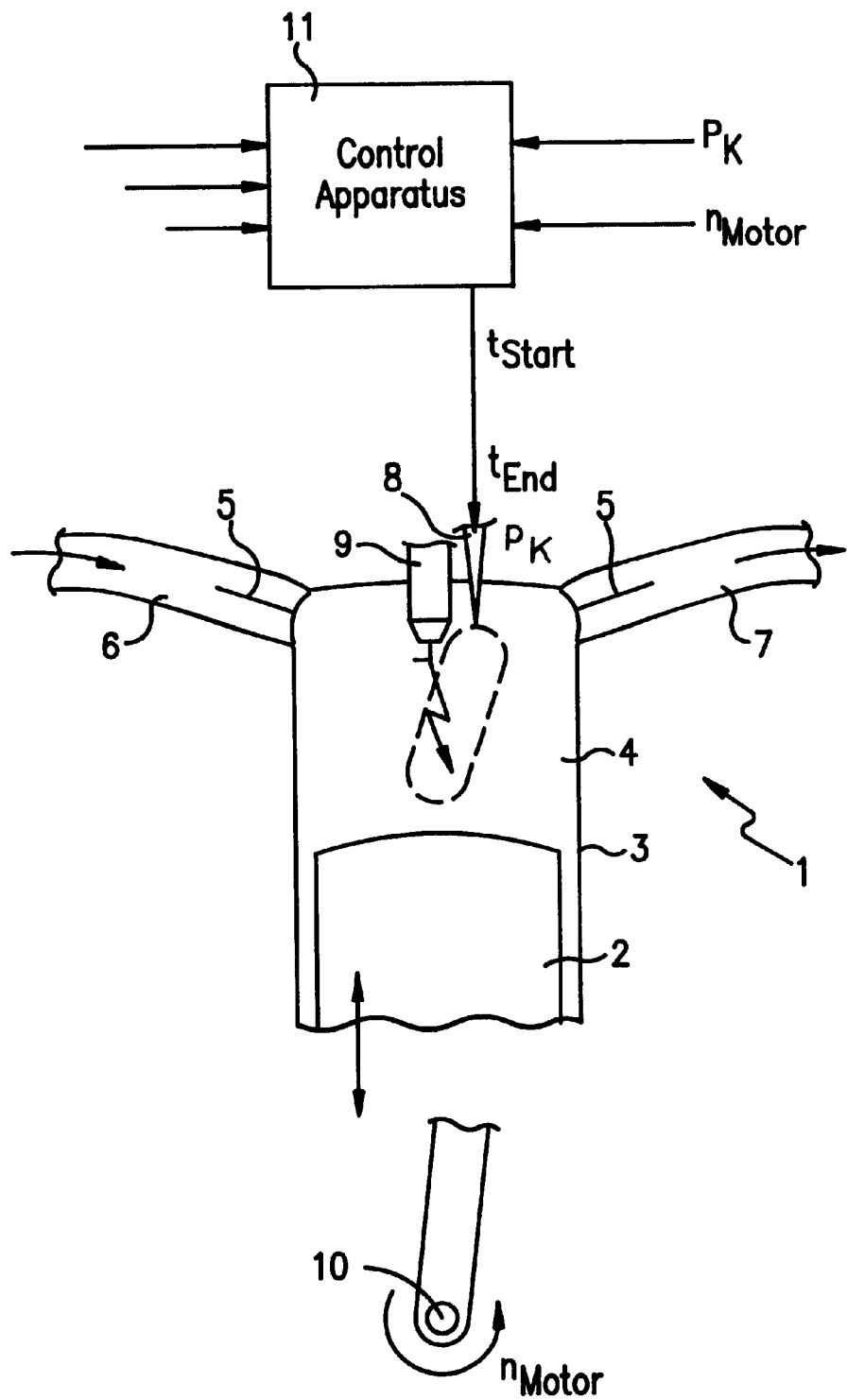
FIG. 1 shows a schematic block circuit diagram of an embodiment of the internal combustion engine of a motor vehicle according to the invention; and, FIG. 2 shows a schematic block circuit diagram of an embodiment of a method of the invention for operating the internal combustion engine of FIG. 1.

An internal combustion engine 1 is shown in FIG. 1 wherein a piston 2 is reciprocally movable in a cylinder 3. The cylinder 3 is provided with a combustion chamber 4 to which an intake manifold 6 and an exhaust-gas pipe 7 are connected via valves 5. In addition, an injection valve 8 and a spark plug 9 are assigned to the combustion chamber 4. A pressure sensor is assigned to the injection valve 8 and generates a signal $P_K$ in dependence upon the pressure operating on the fuel.

In a first operating mode, the stratified mode of operation of the engine 1, the fuel is injected into the combustion chamber 4 by the injection valve 8 during a compression phase caused by the piston 2. This injection is local in the direct vicinity of the spark plug 9 as well as, in time, directly before top dead center of the piston 2. Then, with the aid of the spark plug 9, the fuel is ignited so that the piston 2 is driven in the next operating phase by the expansion of the ignited fuel.

In a second mode of operation, the homogeneous mode of operation of the engine, the fuel is injected by the injection valve 8 into the combustion chamber 4 during an induction phase caused by the piston 2. The injected fuel is swirled by the simultaneously inducted air and thereby essentially uniformly distributed in the combustion chamber 4. Thereafter, the air/fuel mixture is compressed during the compression phase to be then ignited by the spark plug 9. The piston 2 is driven by the expansion of the ignited fuel.

In the stratified mode of operation, as also in homogeneous operation, rotation is imparted to a crankshaft 10 by the driven piston via which the wheels of the motor vehicle are driven. An rpm sensor is assigned to the crankshaft 10 and generates a signal $n_{motor}$ in dependence upon the rotation of the crankshaft 10.

A fuel mass is injected into the combustion chamber 4 during stratified operation and during homogeneous operation. This fuel mass is controlled (open loop and/or closed loop) by a control apparatus 11 especially with respect to a reduced consumption of fuel and/or a reduced generation of exhaust gas. For this purpose, the control apparatus 11 is provided with a microprocessor which has a program stored in a storage medium, especially in a read-only-memory. The program is suitable to carry out the above-mentioned control (open loop and/or closed loop).

Input signals are applied to the control apparatus 11 and represent operating variables of the engine measured by sensors. For example, the control apparatus 11 is connected to the pressure sensor and to the rpm sensor and thereby receives the signals $p_K$ and $N_{motor}$. The control apparatus 11 generates output signals with which the performance of the engine can be influenced via actuators in correspondence to the desired control (open loop and/or closed loop). For example, the control apparatus 11 is connected to the injection valve 8 and the spark plug 9 and generates the signals necessary for driving the same.

The control (open loop and/or closed loop) of the fuel mass injected into the combustion chamber 4, for example, is carried out by the control apparatus 11 in both modes of operation, inter alia, in dependence upon the desired torque $M_{des}$. This desired torque defines that torque which the engine 1 is intended to generate or output. The desired torque $M_{des}$ to be outputted is computed by the control apparatus 11 in dependence upon the power required by the driver and in dependence upon further power requirements of the engine 1. The power required by the driver results from the position of an accelerator pedal sensor and other power requests, for example, from the climate control system, can be derived from corresponding changes of the rpm $n_{motor}$ of the engine 1.

During idle of the engine 1, the desired torque $M_{des}$ results such that the power requirements on the engine 1 are satisfied; otherwise, the rpm $n_{motor}$ of the engine 1 is as low as possible. A further demand is present during idle of the engine 1 in that the rpm $n_{motor}$ is as constant as possible, that is, no rpm fluctuations or the like occur.

Figure 2:
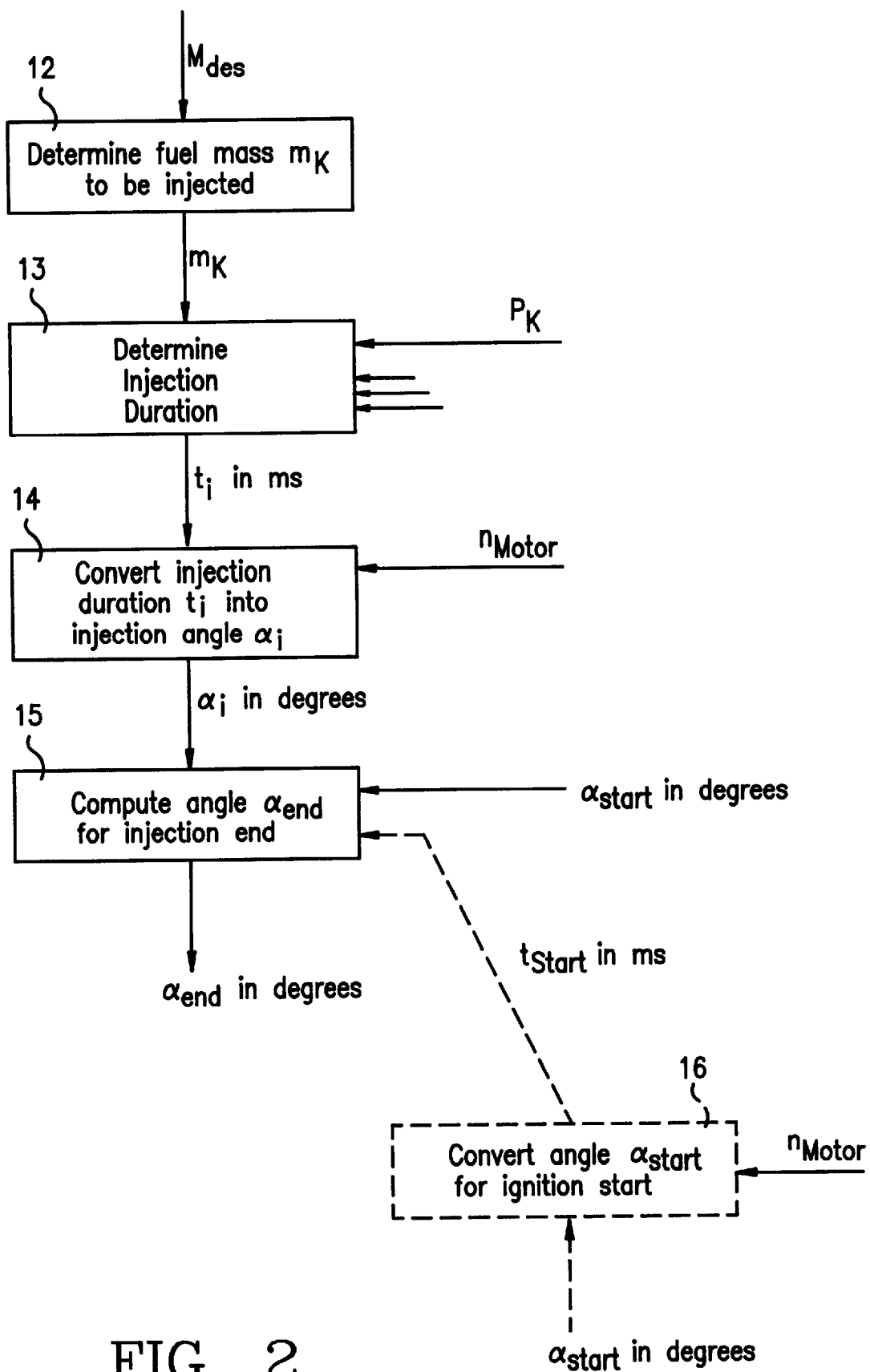

In FIG. 2, a method is shown with which the engine 1 of FIG. 1 is controlled (open loop and/or closed loop). This method is carried out by the control apparatus 11.

In FIG. 2, a fuel mass $m_K$ to be injected is determined by a block 12 from the desired torque $M_{des}$. This computation is dependent on a plurality of parameters of the engine 1 in a manner known per se.

Then, an injection duration ti is determined by a block 13 from the fuel mass $m_K$ to be injected. This time duration $t_i$ is given in a time magnitude, for example, in ms. The computation of the injection duration $t_i$ takes place especially in dependence upon the pressure $p_K$ operating on the fuel as well as on additional parameters of the engine 1 and especially of the injection valve 8.

The injection duration $t_i$ is converted into an injection angle $\alpha_i$ at a specific time point To by a block 14. The injection angle $\alpha_i$ is given as an angle magnitude, for example, in degrees. Thus, the injection duration $t_i$ in ms is converted into the injection angle $\alpha_i$ in degrees. The specific time point $T_0$ is a specific angular position of the crankshaft 10, for example, a crankshaft angle of 0 degrees. The conversion takes place in dependence upon the rpm $n_{motor}$ of the engine 1 at the above-mentioned time point.

It is presumed that the start of an injection of fuel into the combustion chamber 4 of the engine 1 is pregiven. This is given in FIG. 2 by an angle for the injection start $\alpha_{start}$ in degrees which is computed starting from, for example, a crankshaft angle of 0 degrees. The injection valve 8 is therefore opened by the control apparatus 11 precisely when the crankshaft 10 has rotated through the angle for the injection start $\alpha_{start}$ starting from a crankshaft angle of 0 degrees.

A block 15 computes an angle for the injection end $\alpha_{end}$ in degrees by addition of the angle for the injection start $\alpha_{start}$ and the injection angle $\alpha_i$. The injection valve 8 is then closed by the control apparatus 11 precisely when the crankshaft 10 has rotated through the angle for the injection end $\alpha_{end}$ starting from a crankshaft angle of 0 degrees.

As mentioned, the rpm-dependent conversion of the injection duration $t_i$ into the injection angle $\alpha_i$ takes place at time point $T_0$ at a crankshaft angle of 0 degrees. If the rpm $n_{motor}$ of the engine 1 increases thereafter, for example, because of a reduced power demand, then this has no more influence on the above-mentioned computation of the injection angle $\alpha_i$. The injection angle $\alpha_i$ remains the same. The increased rpm $n_{motor}$ has, however, the consequence that the crankshaft 10 rotates faster and that the unchanged injection angle $\alpha_i$ is run through faster. This means that the actual injection duration $t_i$ becomes shorter because of the more rapid passthrough than was provided for or was precomputed. However, the shorter time duration $t_i$ simultaneously defines a reduced actual injected fuel mass $m_K$ than was provided for or precomputed. Because of the reduced fuel mass $m_K$, the engine 1, however, outputs a reduced actual torque which, in turn, means a reduction of rpm $n_{motor}$ of the engine. The initial increase of the rpm $n_{motor}$ of the engine 1 is thereby again automatically reduced. In total, the rpm $n_{motor}$ of the engine 1 is automatically stabilized and an rpm $n_{motor}$ of the engine 1 results which is essentially constant.

The example which follows will again make clear the described method:

| | |
|---|---|
| rpm $n_{motor}$ | 1,000 rpm |
| rpm acceleration | 200 rpm/sec |
| time point $T_0$ of the rpm detection | 0 degrees CS |
| injection duration $t_i$ as a time magnitude | 3 ms |
| injection angle $\alpha_i$ as angle magnitude | 18 degrees CS |
| injection start $\alpha_{start}$ | 270 degrees CS |
| injection end $\alpha_{end}$ | 288 degrees CS |
| actual injection duration $t_i$ | 2.9725 ms |
| relative change of $t_i$ | −0.92%. |

If the engine 1 exhibits an rpm deceleration in lieu of the rpm acceleration after the conversion of the injection duration $t_i$ into the injection angle $\alpha_i$, then the injection angle $\alpha_i$ is run through slower than intended. This defines a lengthening of the injection duration $t_i$ and the therefore the injection of more fuel. In this way, the engine 1 accelerates and therefore the rpm $n_{motor}$ is automatically stabilized.

It is possible that the described automatic correction of the rpm $n_{motor}$ of the engine 1 becomes too great and the rpm $n_{motor}$ overshoots in the other direction; that is, in the first described case, the actual injection duration $t_i$ is so greatly reduced that an rpm deceleration takes place which is greater than the initial rpm acceleration. In order to avoid this problem, it is possible to convert the injection duration $t_i$ only partially into the injection angle $\alpha_i$. Accordingly, the first half of the injection duration $t_i$ is, for example, retained as a time magnitude and only the second half of the injection duration $t_i$ is converted into the injection angle $\alpha_i$ as an angle magnitude. This has the consequence that the shortening of the actual injection duration $t_i$ results only from the converted second half of the injection angle $\alpha_i$ and therefore is less intense.

Likewise, it is possible that the described automatic correction of the rpm $n_{motor}$ of the engine 1 has too low an effect so that a stabilization of the rpm $n_{motor}$ does not occur. In this case, it is possible to modify the described method in correspondence to the embodiment shown in FIG. 2 in phantom outline.

The angle for the injection start $\alpha_{start}$ is converted by block 16 in dependence upon the rpm $n_{motor}$ of the engine 1 at time point $T_0$, that is, at a crankshaft angle of 0 degrees, into a time duration for the injection start $t_{start}$. The start of the injection, that is, the opening of the injection valve 8 is then controlled in dependence upon the time duration for the injection start $t_{start}$ and not, as previously, in dependence upon the corresponding angle. Accordingly, the time duration for the injection start $t_{start}$ is measured after the passthrough of the crankshaft 10 through the crankshaft angle of 0 degrees in order to open the injection valve 8 after the time duration has elapsed.

If an acceleration of the rpm $n_{motor}$ of the engine 1 results during this time duration up to injection start $t_{start}$, then this has the consequence that the crankshaft 10 rotates faster. This means that during the time duration up to the injection start $t_{start}$, the crankshaft 10 rotates through a larger angle than was intended or was calculated in advance. The injection therefore starts at a later crankshaft angle than was provided. However, the angle for the injection end $\alpha_{end}$ remains the same. This has the consequence that the injection angle $\alpha_i$ and therefore also the time duration $t_i$ becomes smaller. Accordingly, less fuel is injected into the combustion chamber 4 of the engine 1 so that the actual torque and therefore the rpm $n_{motor}$ of the engine 1 is reduced.

The following example will again make clear the described change of the method:

| | |
|---|---|
| rpm $n_{motor}$ | 1,000 rpm |
| rpm acceleration | 200 rpm/sec |
| time point $T_0$ of the rpm detection | 0 degrees CS |
| injection duration $t_i$ as time magnitude | 3 ms |
| injection angle $\alpha_i$ as angle magnitude | 18 degrees CS |
| injection start $\alpha_{start}$ as angle magnitude | 270 degrees CS |
| injection start $t_{start}$ as time duration | 45 ms |
| injection end $\alpha_{end}$ | 288 degrees CS |
| actual injection duration $t_i$ | 2.7718 ms |
| relative change of $t_i$ | −7.6%. |

In lieu of the conversion of the entire angle for the injection start $\alpha_{start}$ into a corresponding time duration, it is also possible to convert only a portion of this angle into the time duration for the injection start $t_{start}$. In this way, the correction of the rpm $n_{motor}$ of the engine 1 can be adapted to the particular conditions which are present.

What is claimed is:

1. A method for operating an internal combustion engine including an engine of a motor vehicle, the method comprising the steps of:

detecting the rpm ($n_{motor}$) of said engine;

computing a desired torque ($M_{des}$) which is to be outputted by the engine;

determining a fuel mass ($m_K$) in dependence upon said desired torque ($M_{des}$) which fuel mass ($m_K$) is to be injected into the combustion chamber of said engine in both a first mode of operation during a compression phase and a second mode of operation during an induction phase;

determining an injection duration ($t_i$) from said fuel mass ($m_K$);

determining an injection angle ($\alpha_i$) from said injection duration ($t_i$) in dependence upon said rpm ($n_{motor}$) of said engine; and, injecting said fuel mass ($m_K$) directly into said combustion chamber during said injection angle ($\alpha_i$) in either said first mode of operation during a compression phase or in said second mode of operation during an induction phase.

2. The method of claim 1, wherein either an injection start ($\alpha_{start}$) is pregiven as an angular magnitude and an injection end ($\alpha_{end}$) is determined in dependence upon the injection angle ($\alpha_i$); or, that the injection end ($\alpha_{end}$) is pregiven as angle magnitude and the injection start ($\alpha_{start}$) is determined in dependence upon the injection angle ($\alpha_i$).

3. The method of claim 1, wherein the injection duration ($t_i$) is converted only partially into the injection angle ($\alpha_i$).

4. The method of claim 3, wherein an injection start ($t_{start}$) is determined as a time duration from the injection start ($\alpha_{start}$) as an angle magnitude in dependence upon the rpm ($n_{motor}$) of the engine; and, that the injection of fuel is started after the elapse of this time duration ($t_{start}$).

5. The method of claim 4, wherein the injection start ($\alpha_{start}$) as an angle magnitude is converted only partially into the injection start ($t_{start}$) as a time duration.

6. The method of claim 1, wherein the injection duration ($t_i$) is determined in dependence upon a pressure ($P_K$) operating on the fuel.

7. The method of claim 1, wherein the method is applied in the first operating mode of the engine.

8. The method of claim 1, wherein the method is applied during the start of the engine.

9. The method of claim 1, wherein the method is applied for controlling the idle rpm of the engine and the control being at least one of an open-loop control and a closed-loop control.

10. An electric storage medium including a read-only-memory, for a control apparatus of an engine including an engine of a motor vehicle, on which a program is stored which can be run on a computing apparatus including a microprocessor, and is suitable for carrying out a method including the steps of:

detecting the rpm ($n_{motor}$) of said engine;

computing a desired torque ($M_{des}$) which is to be outputted by the engine;

determining a fuel mass ($m_K$) in dependence upon said desired torque ($M_{des}$) which fuel mass ($m_K$) is to be injected into the combustion chamber of said engine in both a first mode of operation during a compression phase and a second mode of operation during an induction phase;

determining an injection duration ($t_i$) from said fuel mass ($m_K$);

determining an injection angle ($\alpha_i$) from said injection duration ($t_i$) in dependence upon said rpm ($n_{motor}$) of said engine; and, injecting said fuel mass ($m_K$) directly into said combustion chamber during said injection angle ($\alpha_i$) in either said first mode of operation during a compression phase or in said second mode of operation during an induction phase.

11. An internal combustion engine including an engine for a motor vehicle, the engine comprising:

means for detecting the rpm ($n_{motor}$) of said engine;

means for computing a desired torque $M_{des}$ which is to be outputted by the engine;

a control apparatus for determining a fuel mass ($m_K$) in dependence upon said desired torque ($M_{des}$) which fuel mass ($m_K$) is to be injected into the combustion chamber of said engine in both a first mode of operation during a compression phase and a second mode of operation during an induction phase;

means for determining an injection duration ($t_i$) from said fuel mass ($m_K$);

means for determining an injection angle ($\alpha_i$) from said injection duration ($t_i$) in dependence upon said rpm $n_{motor}$ of said engine; and, valve means for injecting said fuel mass ($m_K$) directly into said combustion chamber during said injection angle ($\alpha_i$) in either said first mode of operation during a compression phase or in said second mode of operation during an induction phase.

12. The internal combustion engine of claim 11, wherein the injection duration ($t_i$) is converted by the control apparatus only partially into the injection angle ($\alpha_i$).

13. The internal combustion engine of claim 12, wherein an injection start ($t_{start}$) is determined by the control apparatus from the injection start ($\alpha_{start}$) as an angle magnitude in dependence upon the rpm ($n_{motor}$) of the engine; and, the control apparatus controls the engine in such a manner that the injection of fuel is started after the elapse of this time duration ($t_{start}$).

14. The internal combustion engine of claim 13, wherein the injection start ($\alpha_{start}$) as angle magnitude is converted by said control apparatus only partially into the injection start ($t_{start}$) as a time duration.

* * * * *